(12) United States Patent
Friedman et al.

(10) Patent No.: US 10,360,205 B2
(45) Date of Patent: Jul. 23, 2019

(54) COOPERATIVE MKEY LOCKING FOR MANAGING INFINIBAND NETWORKS

(71) Applicant: International Business Machines Corporation, Armonk, NY (US)

(72) Inventors: Alex Friedman, Hadera (IL); Constantine Gavrilov, Rishon-Le-Zion (IL)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 14/862,309

(22) Filed: Sep. 23, 2015

(65) Prior Publication Data

US 2017/0083559 A1 Mar. 23, 2017

(51) Int. Cl.
*G06F 16/23* (2019.01)

(52) U.S. Cl.
CPC .......... *G06F 16/2343* (2019.01); *G06F 16/23* (2019.01)

(58) Field of Classification Search
CPC ....... G06F 2221/2147; G06F 17/30362; G06F 17/30171; G06F 16/23; G06F 16/2343
See application file for complete search history.

(56) References Cited

U.S. PATENT DOCUMENTS

| | | | |
|---|---|---|---|
| 6,499,031 B1 * | 12/2002 | Hopmann | G06F 21/6218 |
| 6,981,025 B1 * | 12/2005 | Frazier | H04L 69/26 |
| | | | 709/209 |
| 7,010,607 B1 | 3/2006 | Bunton | |
| 7,290,277 B1 * | 10/2007 | Chou | H04L 63/068 |
| | | | 713/152 |
| 7,421,488 B2 | 9/2008 | Elko et al. | |
| 7,653,769 B2 | 1/2010 | Fisher et al. | |
| 7,739,451 B1 | 6/2010 | Wiedenman | |
| 7,843,962 B2 | 11/2010 | Gunthorpe et al. | |
| 8,429,630 B2 | 4/2013 | Nickolov et al. | |
| 8,578,076 B2 | 11/2013 | Van Der Linden et al. | |
| 9,210,100 B2 | 12/2015 | Van Der Linden et al. | |
| 9,219,718 B2 | 12/2015 | Johnsen et al. | |
| 9,438,479 B1 | 9/2016 | Friedman | |

(Continued)

OTHER PUBLICATIONS

Appendix P: List of IBM Patents or Patent Applications Treated as Related; Dated Mar. 23, 2016; 2 pages.

(Continued)

*Primary Examiner* — Jeong S Park
(74) *Attorney, Agent, or Firm* — Gilbert Hannon, Jr.; Edward J. Wixted, III

(57) ABSTRACT

In an approach for managing read-modify-write operations within a network. Aspects of an embodiment of the present invention include an approach for managing read-modify-write operations within a network, wherein the approach includes a processor for determining that a lock associated with a component of a network is set. A processor identifies a key associated with the lock. A processor determines that the key associated with the lock has not been altered since a previous time cycle. A processor responsive to determining that the key associated with the lock has not been altered, determines that a lock timeout has expired for the key, wherein the lock timeout specifies, at least, a period of time. A processor responsive to determining that the lock timeout has expired for the key, releases the lock.

20 Claims, 3 Drawing Sheets

(56) References Cited

U.S. PATENT DOCUMENTS

| | | | |
|---|---|---|---|
| 2003/0005039 A1 | 1/2003 | Craddock et al. | |
| 2003/0110344 A1 | 6/2003 | Szczepanek | |
| 2004/0054828 A1 | 3/2004 | Finch | |
| 2004/0073742 A1 | 4/2004 | Arimilli | |
| 2004/0109457 A1 | 6/2004 | Johnson | |
| 2004/0190546 A1 | 9/2004 | Jackson | |
| 2005/0038883 A1 | 2/2005 | Elko et al. | |
| 2005/0097567 A1* | 5/2005 | Monnie | G06F 9/52 719/315 |
| 2005/0243800 A1 | 11/2005 | Horoschak | |
| 2006/0101081 A1* | 5/2006 | Lin | G06F 16/2343 |
| 2007/0283357 A1* | 12/2007 | Jeter | G06F 9/5027 718/102 |
| 2008/0144531 A1 | 6/2008 | Fisher et al. | |
| 2008/0201403 A1 | 8/2008 | Andersson et al. | |
| 2009/0031307 A1 | 1/2009 | Chodroff et al. | |
| 2009/0063488 A1* | 3/2009 | Daum | G06F 16/2343 |
| 2009/0175166 A1 | 7/2009 | Long | |
| 2009/0276771 A1 | 11/2009 | Nickolov et al. | |
| 2009/0307378 A1 | 12/2009 | Allen | |
| 2010/0274943 A1 | 10/2010 | Mahadevan et al. | |
| 2011/0022812 A1 | 1/2011 | Van Der Linden et al. | |
| 2011/0274010 A1 | 11/2011 | Kwon et al. | |
| 2012/0059963 A1* | 3/2012 | Pasupuleti | G06F 16/2343 710/200 |
| 2012/0079090 A1 | 3/2012 | Johnsen et al. | |
| 2012/0127855 A1 | 5/2012 | Alon | |
| 2013/0013830 A1 | 1/2013 | Jia | |
| 2013/0051222 A1 | 2/2013 | Gavrilov et al. | |
| 2013/0054947 A1 | 2/2013 | Gavrilov | |
| 2013/0132499 A1 | 5/2013 | Wu | |
| 2013/0262937 A1 | 10/2013 | Sridharan et al. | |
| 2013/0301646 A1 | 11/2013 | Bogdanski et al. | |
| 2013/0304908 A1* | 11/2013 | Johnsen | H04L 41/0806 709/224 |
| 2014/0025770 A1 | 1/2014 | Warfield | |
| 2014/0040343 A1 | 2/2014 | Nickolov et al. | |
| 2014/0052864 A1 | 2/2014 | Van Der Linden et al. | |
| 2014/0105029 A1 | 4/2014 | Jain et al. | |
| 2014/0185615 A1 | 7/2014 | Ayoub | |
| 2014/0269720 A1 | 9/2014 | Srinivasan | |
| 2014/0281462 A1 | 9/2014 | Friedman et al. | |
| 2015/0207793 A1 | 7/2015 | Mohamed | |
| 2015/0319749 A1 | 11/2015 | Wadhwa | |
| 2017/0085430 A1 | 3/2017 | Friedman | |

OTHER PUBLICATIONS

U.S. Appl. No. 15/078,018, filed Mar. 23, 2016; Entitled "Distributed Subnet Manager for Infiniband Networks".

U.S. Appl. No. 15/078,080, filed Mar. 23, 2016; Entitled "Election and Use of Configuration Manager".

Appendix P: List of IBM Patents or Patent Applications Treated as Related; Dated Sep. 23, 2015; 2 pages.

U.S. Appl. No. 14/862,235, filed Sep. 23, 2015; Entitled "Distributed Subnet Manager for Infiniband Networks".

U.S. Appl. No. 14/862,255, filed Sep. 23, 2015; Entitled "Election and Use of Configuration Manager".

Vishnu, et al.;"Performance Modeling of Subnet Management on Fat Tree InfiniBand Networks using OpenSM"; Proceedings of the 19th IEEE International Parallel and Distributed Processing Symposium (IPDPS'05); 2005; pp. 1-8; IEEE Computer Society.

IBM; "Driving performance with the IBM XIV Storage System"; IBM Systems and Technology; White Paper; Copyright IBM Corporation 2013; Apr. 2013; pp. 1-15.

IBM; "Low Cost Method for Implementing an InfiniBand Linear Forwarding Table"; IP.com; IP.com No. 000133316; Jan. 23, 2006; pp. 1-3.

Kashyap; "IP over InfiniBand (IPoIB) Architecture (RFC4392)"; IP.com; Original Publication Date: Apr. 1, 2006; IP.com No. 000135266; IP.com Electronic Publication date: Apr. 8, 2006. pp. 1-23; Copyright © The Internet Society (2006).

"A self-configuring network"; IP.com; IP.com No. 000007386; Mar. 20, 2002; 1 page.

"Method and System for Network Self Healing using Network Intelligence"; IP.com; IP.com No. 000219386; Jun. 27, 2012; pp. 1-11.

"Method for Topology Independent Path Determination in InfiniBand Subnets"; IP.com; IP.com No. 000012791; May 28, 2003; 6 pages.

* cited by examiner

COOPERATIVE MKEY LOCKING FOR MANAGING INFINIBAND NETWORKS

BACKGROUND

The present invention relates generally to the field of Infiniband networks, and more particularly to achieving a coherent in-band switch management in a distributed environment.

InfiniBand is an industry-standard specification that defines an input/output architecture used to interconnect servers, communications infrastructure equipment, storage and embedded systems. InfiniBand is a computer network communications connection used in high-performance computing featuring very high throughput and very low latency. InfiniBand is used for data interconnect both among and within computers. Infiniband is a commonly used interconnect in supercomputers. InfiniBand is a type of communications connection for data flow between processors and I/O devices that offers throughput of up to 56 gigabits per second and support for up to 64,000 addressable devices.

The internal data flow system in most personal computers (PCs) and server systems is inflexible and relatively slow. As the amount of data coming into and flowing between components in the computer increases, the existing bus system becomes a bottleneck. Instead of sending data in parallel (typically 32 bits at a time, but in some computers 64 bits) across the backplane bus, InfiniBand specifies a serial (bit-at-a-time) bus. Fewer pins and other electrical connections are required, saving manufacturing cost and improving reliability. The serial bus can carry multiple channels of data at the same time in a multiplexing signal. InfiniBand also supports multiple memory areas, each of which can addressed by both processors and storage devices.

With InfiniBand, data is transmitted in packets that together form a communication called a message. A message can be a remote direct memory access (RDMA) read or write operation, a channel send or receive message, a reversible transaction-based operation or a multicast transmission. Like the channel model many mainframe users are familiar with, transmission begins or ends with a channel adapter. Each processor (your PC or a data center server, for example) has what is called a host channel adapter (HCA) and each peripheral device has a target channel adapter (TCA). HCAs are I/O engines located within a server. TCAs enable remote storage and network connectivity into the Infiniband interconnect infrastructure, called a fabric.

Infiniband networks are set up and managed using in-band communication from a software entity called Subnet Manager. The physical link management is done in hardware, and when the physical links are brought up, the Subnet Manager performs the discovery of fabric and assigns addresses to discovered switches, HCAs, and TCAs. Subnet Manager communicates with the discovered devices using source based routing, specifying the route from end-to-end (direct routing in Infiniband terms). The configuration and discovery are done via sending SMP (subnet manager protocol) MAD (management datagrams) messages. When addresses are assigned, the Subnet Manager configures the routing tables on switches, and moves all discovered link end-points to logical "ACTIVE" state (in non-active state, the end-points can only use direct routing for communication). In active state, routing by destination address can be used. The switch will do the routing in this case consulting its routing tables which match destination address and switch port number. There are two types of switch routing tables. For unicast traffic, the LFT (linear forwarding table) is used. It matches destination address with a single output switch port. For multicast traffic, the MFT (multicast forwarding table) is used. It matches a multicast destination address with a list of switch ports to deliver the packet.

SUMMARY

Embodiments of the present invention disclose a method, a computer program product, and a computer system for managing read-modify-write operations within a network. Aspects of an embodiment of the present invention include an approach for managing read-modify-write operations within a network, wherein the approach includes a processor for determines that a lock associated with a component of a network is set. A processor identifies a key associated with the lock. A processor determines that the key associated with the lock has not been altered since a previous time cycle. A processor responsive to determining that the key associated with the lock has not been altered, determines that a lock timeout has expired for the key, wherein the lock timeout specifies, at least, a period of time. A processor responsive to determining that the lock timeout has expired for the key, releases the lock.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may generally be referred to herein as a "circuit," "module", or "system." Furthermore, aspects of the present invention may take the form of a computer program product embodied in one or more computer readable medium(s) having computer readable program code/instructions embodied thereon.

Embodiments of the present invention recognize that aspects of in-band fabric configuration are a well-established standard. At the same time, election of Subnet Manager and resolving elections are subject to interpretation and implementation and in-band management assumes configuration is done by a single entity. This is especially true for routing table updates, since routing table updates are done in blocks of multiple entries (i.e., a single entry cannot be changed).

Embodiments of the present invention disclose a method, computer program product, and computer system, to provide a process for managing read-modify-write configuration updates within a network.

The Present Invention Will Now be Described in Detail with Reference to the Figures.

Figure 1:
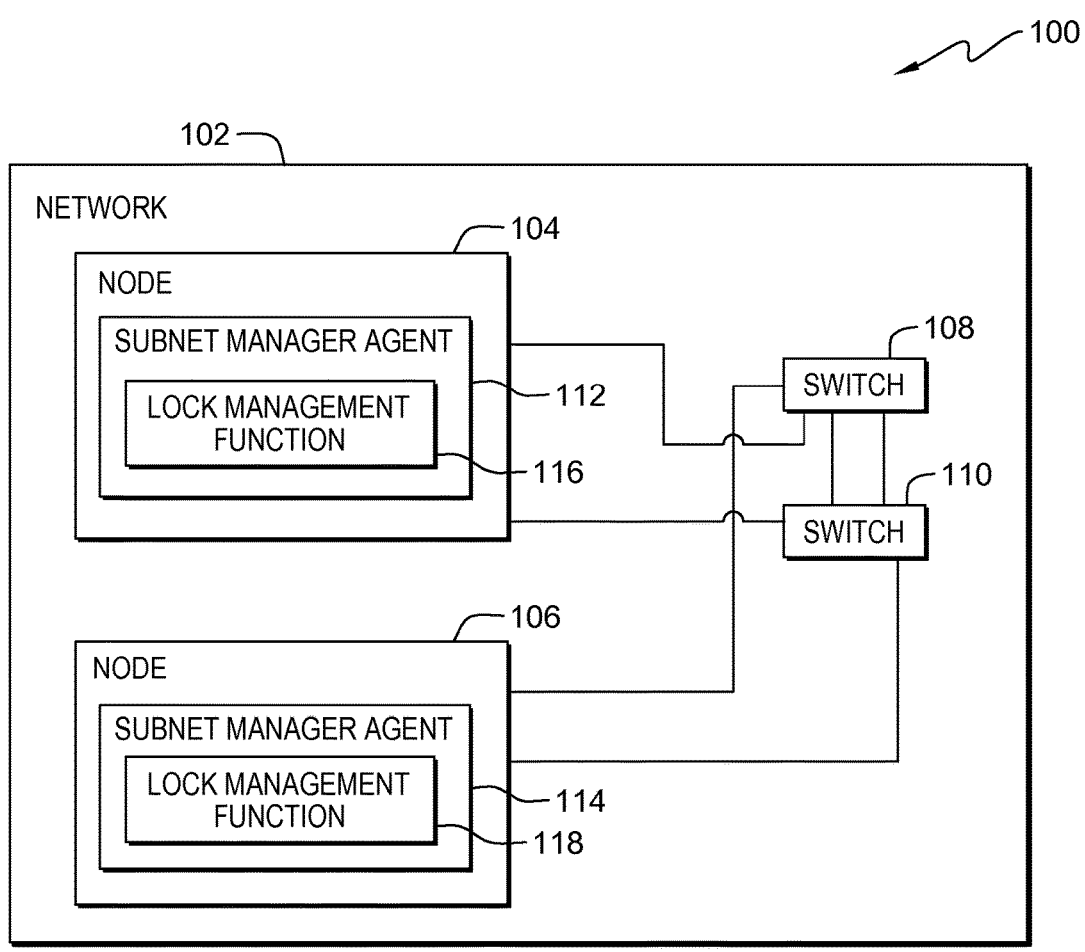
FIG. 1 depicts a block diagram of a computing environment, in accordance with one embodiment of the present invention.

FIG. 1 depicts a block diagram of computing environment 100 in accordance with one embodiment of the present invention. FIG. 1 provides an illustration of one embodiment and does not imply any limitations regarding computing environment 100 in which different embodiments may be implemented. In the depicted embodiment, computing environment 100 includes, but is not limited to, network 102, node 104, node 106, switch 108, and switch 110. Computing environment 100 may include additional computing devices, servers, computers, switches, or other devices not shown.

Network 102 may be a local area network (LAN), a wide area network (WAN) such as the Internet, any combination thereof, or any combination of connections and protocols that support communications between node 104, node 106, switch 108 and switch 110. Network 102 may be a subnet, or other type of network that is embedded in a larger system. In one embodiment, network 102 is an Infiniband network. Network 102 may include wired, wireless, or fiber optic connections. Network 102 provides a network for nodes 104 and node 106 to communicate with one another without the significant overhead of an operating system. Additionally, network 102 allows nodes 104 and 106 to discover and configure the network fabric.

Node 104 and node 106 each can be a source or destination in communication. Node 104 and node 106 are substantially similar to one another. A communication can be a message, data, or other information that is sent from one location (e.g., a source) to a next location (e.g., a destination) in computing environment 100. Nodes 104 and 106 may be a desktop computer, laptop computer, tablet computer, netbook computer, personal computer (PC), a desktop computer, mobile device, or any programmable electronic device capable of communicating via network 102. Node 104 and node 106 may be, for example, a host node, a destination node, a target node, an initiator node, or any other type of node within the network fabric. In one embodiment, nodes 104 and 106 may be a storage initiator, a storage target, a database server, a database client, a management server, a web server, or other electronic device or computing system capable of processing program instructions and receiving and sending data. In another embodiment, nodes 104 and 106 may be any hardware component such as a processor, random access memory (RAM) or other hardware components that output data that is then sent to another hardware component.

Switch 108 and switch 110 are computer networking devices that connect devices together on network 102. Switch 108 and switch 110 are substantially similar to one another. In another embodiment, switch 108 and switch 110 are not substantially similar to one another but are able to communicate with each other. Network 102 can contains at least one switch. Switches 108 and 110 route messages or data from the source to the destination based on routing tables that are populated with forwarding information during startup of network 102 or modifications to network 102, as described below. The routing tables may describe unicast or multicast rules and conform to Infiniband LFT and MFT specifications. In another embodiment, the format, content, and organization of the routing tables in switches 108 and 110 is vendor specific. In another embodiment, switches 108 and 110 are multiport network bridges that use hardware addresses to process and forward data. In other embodiments, switches 108 and 110 can also process data at the network layer by additionally incorporating routing functionality. In one embodiment, the size and number of ports of switches 108 and 110 may vary. In one embodiment, switches 108 and 110 manage the flow of data across network 102 by transmitting a received message from node 104 to node 106. In another embodiment, switch 108 manages the flow of data across network 102 by exchanging a received message from node 106 to node 104.

Subnet manager agent 112 and subnet manager agent 114 control the management, assignment of addresses, and connectivity between a plurality of nodes connected to the fabric of network 102. The fabric of network 102 is the network topology in which devices, nodes, switches, or other components within network 102 pass data. During startup or changes to network 102, subnet manager agent 112 or subnet manager agent 114 make changes to the routing tables of switches 108 and 110. When configuring switches (including the routing table updates), subnet manager agent 112 or subnet manager agent 114 may invoke lock management function 116, respectively. In one embodiment of the present invention, subnet manager agent 112 or subnet manager agent 114 are implemented as a software application, running on node 104 or 106, respectively. In other embodiments of the present invention, the subnet manager agent 112 or subnet manager agent 114 can be implemented in hardware, software or firmware of a switch.

Lock management function 116 and lock management function 118 control access to switch configuration of switches 108 and 110. Various aspects of switch configuration can be done under lock—the LFT and MFT table updates, switches capabilities, multi-port VL (virtual lane) arbitration setup, multi-port SL (service level) to VL mapping, turning ports on and off, or taking an in-band FW dump, etc. Concurrent access to these management functions can cause network interruptions, permanent loss of communication, and other unexpected results. For example, routing table updates are typically performed in blocks. A block update is when several updates are all input at once into the routing table or when each update is a block itself specifying multiple entries. Due to the block updates there is an opportunity for the routing table to be corrupted by more than one component.

Lock management function 116 and lock management function 118, can control the access to the routing table to remove the possibility of errors occurring in the routing table during concurrent update. If entire block needs to be modified, then setting of that block is done under lock. If part of the block needs to be modified, then read_block( )-mofify_block( )-write_block( ) sequence id done under lock.

In one embodiment, lock management function 116 and lock management function 118 can be used as a means to protect against the negative consequences of having multiple subnet manager instances that are unaware of one another. This is applicable to existing and new implementations. Existing implementations and standards do not preclude this situation from happening and do not specify a working recovery path. When network timeouts occur (e.g., because of some end-points being busy or rebooting), existence of two subnet manager agents, each of which detects a subset of end-points only, is quite possible. Setting a routing table from two locations may cause complete loss of connectivity in this case.

In another embodiment, lock management function 116 and lock management function 118 can be used to implement a distributed Subnet Manager, where fabric discovery and updates of switch configurations are performed from multiple locations to speed up the network bring up.

In one embodiment, lock management function 116 and lock management function 118 use management keys (MKEY) to lock switches 108 and 110. The MKEY can be set via the Set( ) method of the PortInfo SMP attribute. In the same Set( ) the value of MkeyProtectionBits is set to 0. Following Set( ) methods of various SMPs will not succeed if the same value of MKEY is not used for authentication, but the Get( ) methods will work. In other embodiments, Lock management function 116 and lock management function 118 may be implemented using a communication to on an alternative server, computer, or computing device, provided lock management function 116 and lock management function 118 are able to communicate with other devices, programs, or components.

Figure 2:
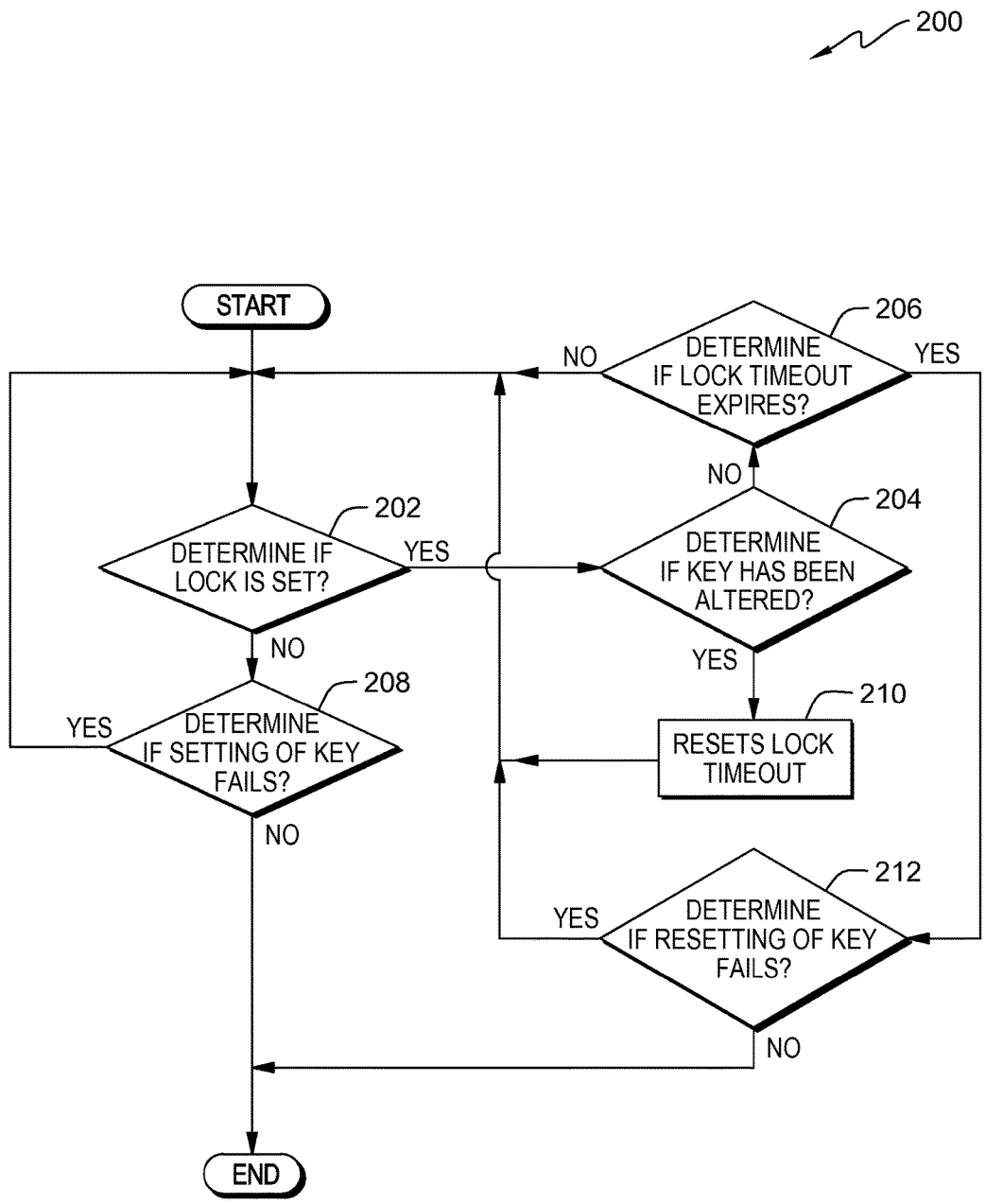
FIG. 2 depicts a flowchart of the operational steps for the locking function approach to managing switch updates in the routing table, within the computing environment of FIG. 1, in accordance with one embodiment of the present invention.

FIG. 2 depicts a flowchart 200 of the operational steps for lock management function 116 approach to managing switch updates in network 102, within the computing environment of FIG. 1, in accordance with one embodiment of the present invention. The steps for lock management function 118 operates in a similar manner.

In decision 202, lock management function 116 determine if the lock is set. A lock is an authentication mechanism for controlling access to a component of network 102. In one embodiment, the component is switch 108 or switch 110. In another embodiment, the component is the routing table of switch 108 or switch 110. In other embodiments, the component can be node 104, node 106, or other components of network 102. In one embodiment, testing whether the lock is set is done by using Get( ) method of the Portinfo SMP attribute of the managed component and checking whether MKEY field of the result is not zero. In another embodiment, the lock check is performed by querying a software application of the managed component. In yet another embodiment, the lock check is done by querying an application on a remote computer. A lock is set if the lock is engaged to stop other components from modifying configuration of the managed component. If lock management function 116 determines the lock is set (decision 202, Yes branch, proceed to decision 204) lock management function determines if the key has been altered. If lock management function 116 determines the lock is not set (decision 202, No branch, proceed to decision 208) lock management function 116 determines if the setting of the key fails.

In decision 204, lock management function 116 determines if the key has been altered. Each lock has a key. In one embodiment, each lock has a specific key associated with the lock. Each lock has more than one key associated with the lock, and each party that wants to take the lock uses unique key. The key may be altered while the component is being accessed. The alteration of the key can be in many forms, for example if switch 108 or switch 110 is modified, if certain modifications are performed on the routing table, if subnet manager agent 112 or subnet manager agent 114 modifies the key, or if network 102 is modified. In one embodiment, the key and lock combination is specific and the modified key does not grant a component access to another lock. In another embodiment, the key and lock combination is not specific and the modified key grants a component access to another lock. If lock management function 116 determines the key has been altered (decision 204, Yes branch, proceed to step 210) lock management function 116 resets the lock timeout. If lock management function 116 determines the key has not been altered (decision 204, No branch, proceed to decision 206) lock management function 116 determines if the lock timeout expires.

In decision 206, lock management function 116 determines if the lock timeout expires. If the lock is set, there is a predetermined period of time for the component to keep other components from accessing the locked component. Once the predetermined period of time expires the lock shall be released. If lock management function 116 determines the lock timeout has expired (decision 206, Yes branch, proceed to step 212) lock management function 116 resets the key. Resetting the key ensures continued management access in the case of run-away or crashed applications. If lock management function 116 determines that the lock timeout has expired (decision 206, No branch, proceed to decision 202) lock management function 116 determines if the lock is set.

In decision 208, lock management function 116 attempts to set the key and determines if the setting of the key fails. Setting of the key is done using the key of the locking party and using empty authentication key (i.e. it is assumed the lock is not set). In one embodiment, setting the key is done via Set( ) method of the SMP PortInfo attribute (using empty authentication), while setting the MKEY value to non-zero and MKeyProtectionBits to zero. In another embodiment, attempt to set the key is done by communicating with a software application on a managed resource. In yet another embodiment, attempt to set the key is done by communicating with a software running on another computer. If lock management function 116 determines the setting of the key does not fail (No branch, proceed to End), then the lock has been acquired and the management function ends. If lock management function 116 determines that setting of the key fails (the setting of the key fails when another component has already gained access to the key—decision 208, Yes branch, proceed to decision 202) lock management function 116 determines if the lock is set.

In step 210, lock management function 116 resets lock timeout. The resetting of the lock out timeout occurs when an alteration has been made to the key and the lock out timer needs to be reset and the process is started over again.

In step 212, the lock management function attempts to reset the key and determines if the operation fails. Resetting of the key is done using the key of the locking party and observed authentication key. In one embodiment, setting the key is done via Set( ) method of the SMP PortInfo attribute (using mon-empty authentication), while setting the MKEY value to non-zero and MKeyProtectionBits to zero. In another embodiment, attempt to reset the key is done by communicating with a software application on a managed resource. In yet another embodiment, attempt to reset the key is done by communicating with a software running on another computer. If lock management function 116 determines the resetting of the key does not fail (No branch, proceed to End), then the lock has been acquired and the management function ends. If lock management function 116 determines that resetting of the key fails (the setting of the key fails when another component has already gained access to the key—decision 212, Yes branch, proceed to decision 202) lock management function 116 determines if the lock is set.

Figure 3:
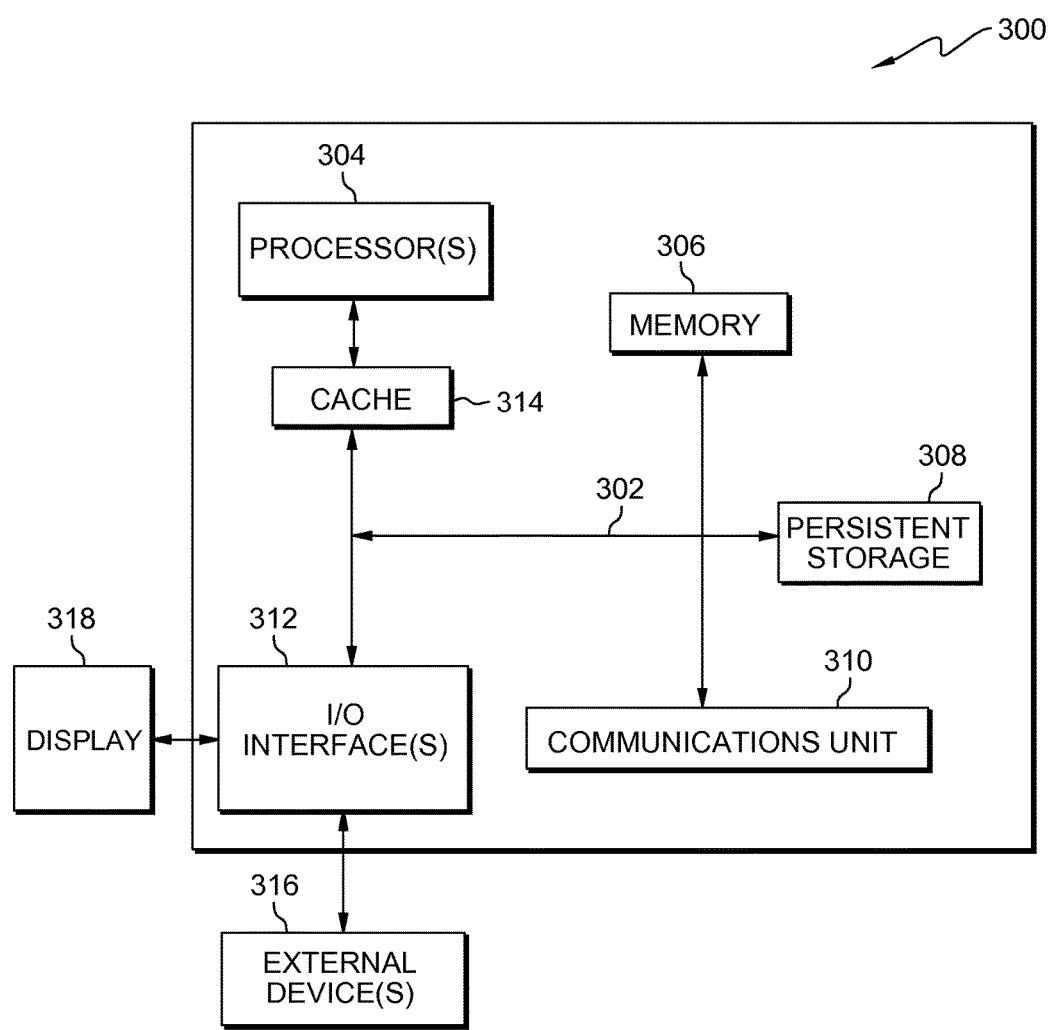
FIG. 3 depicts a block diagram of the internal and external components of the server and the authorized user computing device of FIG. 1, in accordance with one embodiment of the present invention.

FIG. 3 depicts a block diagram 300 of components of server 104, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server 104 includes communications fabric 302, which provides communications between computer processor(s) 304, memory 306, persistent storage 308, communications unit 310, and input/output (110) interface(s) 312. Communications fabric 302 can be implemented with any architecture designed for passing data and/or control information between processors (such as microprocessors, communications and network processors, etc.), system memory, peripheral devices, and any additional hardware components within a system. For example, communications fabric 302 can be implemented with one or more buses.

Memory 306 and persistent storage 308 are computer-readable storage media. In one embodiment, memory 306 includes random access memory (RAM) and cache memory 314. In general, memory 306 can include any suitable volatile or non-volatile computer-readable storage media.

Memory 306 is stored for execution by one or more of the respective computer processors 304 of server 104 via one or more memories of memory 306 of server 104. In the depicted embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in the examples, provides for communications with other data processing systems or devices, including server 104. In the examples, communications unit 310 includes one or more network interface cards. Communications unit 310 may provide communications through the use of either or both physical and wireless communications links.

I/O interface(s) 312 allows for input and output of data with other devices that may be connected to server 104. For example, I/O interface 312 may provide a connection to external devices 316 such as a keyboard, keypad, camera, a touch screen, and/or some other suitable input device. External devices 316 can also include portable computer-readable storage media such as, for example, thumb drives, portable optical or magnetic disks, and memory cards. Software and data used to practice embodiments of the present invention, e.g., function of statistical machine translation program 108 can be stored on such portable computer-readable storage media and can be loaded onto persistent storage 308 of server 104 via I/O interface(s) 312 of server 104. Software and data used to practice embodiments of the present invention, e.g., lock management function 116 or lock management function 118 can be stored on such portable computer-readable storage media and can be loaded onto persistent storage 308 of server 104 via I/O interface(s) 312 of server 104. I/O interface(s) 312 also connect to a display 318.

Display 318 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing read-modify-write operations by cooperating tasks within a network, the method comprising:
    determining, by one or more processors, that a lock associated with a component of an InfiniBand network is set based on a subnet management response packet (SMP) attribute method call, wherein the component is a portion of a routing table associated with a network switch;
    identifying, by one or more processors, a management key associated with the lock based on a SMP attribute method call;
    determining, by one or more processors, that the management key associated with the lock has not been altered since a previous time cycle based on a SMP attribute method call;
    responsive to determining that the key associated with the lock has not been altered, determining, by one or more processors, that a lock timeout has expired for the management key based on a SMP attribute method call, wherein the lock timeout specifies, at least, a period of time; and
    responsive to determining that the lock timeout has expired for the management key, resetting, by one or more processors, the lock based on a SMP attribute method call.

2. The method of claim 1, further comprising:
    determining, by one or more processors, that the lock associated with the component of the InfiniBand network is released;
    determining, by one or more processors, that the setting of the management key failed; and
    responsive to determining that the setting of the management key failed, determining, by one or more processors, whether the lock associated with the component of the InfiniBand network is set.

3. The method of claim 2, wherein determining that the setting of the management key failed comprises:
    determining, by one or more processors, that an entity has gained access to the key.

4. The method of claim 1, further comprising:
    determining, by one or more processors, that the lock associated with the component of the InfiniBand network is released;
    determining, by one or more processors, that the setting of the management key has not failed; and
    responsive to determining that the setting of the management key has not failed, setting, by one or more processors, the key associated with the lock.

5. The method of claim 1, further comprising:
    setting, by one or more processors, the management key associated with the lock.

6. The method of claim 5, further comprising:
    determining, by one or more processors, that the lock associated with the component of the InfiniBand network is set;
    determining, by one or more processors, that the management key associated with the lock has been altered within the previous time cycle; and
    responsive to determining that the key associated with the lock has been altered, resetting, by one or more processors, the lock timeout for the key.

7. The method of claim 1, further comprising:
    determining, by one or more processors, that the lock associated with the component of the InfiniBand network is set;
    determining, by one or more processors, that the management key associated with the lock has not been altered within the previous time cycle;
    determining, by one or more processors, that the lock timeout for the management key has not expired; and
    responsive to determining that the lock timeout for the management key has not expired, determining by one or more processors, if the lock is set.

8. A computer program product for managing read-modify-write operations by cooperating tasks within a network, the computer program product comprising:
    one or more non-transitory computer readable storage media and program instructions stored on the one or more non-transitory computer readable storage media, the program instructions comprising:

program instructions to determine that a lock associated with a component of an InfiniBand network is set based on a SMP attribute method call wherein the component is a portion of a routing table associated with a network switch;

program instructions to identify a management key associated with the lock based on a SMP attribute method call;

program instructions to determine that the management key associated with the lock has not been altered since a previous time cycle based on a SMP attribute method call;

program instructions to, responsive to determining that the management key associated with the lock has not been altered, determine that a lock timeout has expired for the management key based on a SMP attribute method call, wherein the lock timeout specifies, at least, a period of time; and program instructions to, responsive to determining that the lock timeout has expired for the key, reset the lock based on a SMP attribute method call.

9. The computer program product of claim 8, further comprising:

program instructions, stored on the one or more computer readable storage media, to determine that the lock associated with the component of the InfiniBand network is released;

program instructions, stored on the one or more computer readable storage media, to determine that the setting of the management key failed; and program instructions, stored on the one or more computer readable storage media, to, responsive to determining that the setting of the management key failed, determine whether the lock associated with the component of the InfiniBand network is set.

10. The computer program product of claim 9, wherein determining that the setting of the management key failed comprises:

program instructions media, to determine that an entity has gained access to the management key.

11. The computer program product of claim 8, further comprising:

program instructions, stored on the one or more computer readable storage media, to determine that the lock associated with the component of the InfiniBand network is released;

program instructions, stored on the one or more computer readable storage media, to determine that the setting of the management key has not failed; and program instructions, stored on the one or more computer readable storage media, to, responsive to determining that the setting of the management key has not failed, set the management key associated with the lock.

12. The computer program product of claim 8, further comprising:

program instructions, stored on the one or more computer readable storage media, to set the management key associated with the lock.

13. The computer program product of claim 12, further comprising:

program instructions, stored on the one or more computer readable storage media, to determine that the lock associated with the component of the InfiniBand network is set;

program instructions, stored on the one or more computer readable storage media, to determine that the management key associated with the lock has been altered within the previous time cycle; and program instructions, stored on the one or more computer readable storage media, to, responsive to determining that the management key associated with the lock has been altered, reset the lock timeout for the management key.

14. The computer program product of claim 8, further comprising:

program instructions, stored on the one or more computer readable storage media, to determine that the lock associated with the component of the InfiniBand network is set;

program instructions, stored on the one or more computer readable storage media, to determine that the management key associated with the lock has not been altered within the previous time cycle;

program instructions, stored on the one or more computer readable storage media, to determine that the lock timeout for the management key has not expired; and program instructions to, responsive to determining that the lock timeout for the management key has not expired, determine if the lock is set.

15. A computer system for managing read-modify-write operations within a network, the computer system comprising:

one or more computer processors, one or more non-transitory computer readable storage media, and program instructions stored on the one or more non-transitory computer readable storage media for execution by at least one of the one or more processors, the program instructions comprising:

program instructions to determine that a lock associated with a component of an InfiniBand network is set based on a SMP attribute method call;

program instructions to identify a management key associated with the lock based on a SMP attribute method call;

program instructions to determine that the management key associated with the lock has not been altered since a previous time cycle based on a SMP attribute method call;

program instructions to, responsive to determining that the management key associated with the lock has not been altered, determine that a lock timeout has expired for the management key based on a SMP attribute method call, wherein the lock timeout specifies, at least, a period of time; and program instructions to, responsive to determining that the lock timeout has expired for the management key, reset the lock based on a SMP attribute method call.

16. The computer system of claim 15, further comprising:

program instructions, stored on the computer readable storage media for execution by at least one of the one or more processors, to determine that the lock associated with the component of the InfiniBand network is released;

program instructions, stored on the computer readable storage media for execution by at least one of the one or more processors, to determine that the setting of the management key failed; and program instructions, stored on the computer readable storage media for execution by at least one of the one or more processors, to, responsive to determining that the setting of the management key failed, determine whether the lock associated with the component of the InfiniBand network is set.

17. The computer system of claim 16, wherein determining that the setting of the management key failed comprises:
program instructions to determine that an entity has gained access to the management key.

18. The computer system of claim 15, further comprising:
program instructions, stored on the computer readable storage media for execution by at least one of the one or more processors, to determine that the lock associated with the component of the InfiniBand network is released;
program instructions, stored on the computer readable storage media for execution by at least one of the one or more processors, to determine that the setting of the management key has not failed; and
program instructions, stored on the computer readable storage media for execution by at least one of the one or more processors, to, responsive to determining that the setting of the management key has not failed, set the management key associated with the lock.

19. The computer system of claim 15, further comprising:
program instructions, stored on the computer readable storage media for execution by at least one of the one or more processors, to set the management key associated with the lock.

20. The computer system of claim 19, further comprising:
program instructions, stored on the computer readable storage media for execution by at least one of the one or more processors, to determine that the lock associated with the component of the InfiniBand network is set;
program instructions, stored on the computer readable storage media for execution by at least one of the one or more processors, to determine that the management key associated with the lock has been altered within the previous time cycle; and
program instructions, stored on the computer readable storage media for execution by at least one of the one or more processors, to, responsive to determining that the management key associated with the lock has been altered, reset the lock timeout for the management key.

* * * * *